(12) United States Patent
Bergmann et al.

(10) Patent No.: US 10,542,238 B2
(45) Date of Patent: Jan. 21, 2020

(54) COLLABORATIVE VIRTUAL REALITY ONLINE MEETING PLATFORM

(71) Applicant: FARO Technologies, Inc., Lake Mary, FL (US)

(72) Inventors: Louis Bergmann, Stuttgart (DE); Jörg Braunes, Dresden (DE); Daniel Flohr, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/131,437

(22) Filed: Sep. 14, 2018

(65) Prior Publication Data
US 2019/0098255 A1 Mar. 28, 2019

Related U.S. Application Data

(60) Provisional application No. 62/561,879, filed on Sep. 22, 2017.

(51) Int. Cl.
*H04N 7/15* (2006.01)
*G06Q 10/10* (2012.01)
(Continued)

(52) U.S. Cl.
CPC ........... *H04N 7/157* (2013.01); *G06Q 10/103* (2013.01); *G06Q 10/1093* (2013.01);
(Continued)

(58) Field of Classification Search
USPC .................................................... 348/14.08
See application file for complete search history.

(56) References Cited

U.S. PATENT DOCUMENTS 6,285,392 B1 * 9/2001 Satoda .................. H04N 7/142
348/14.08
6,330,022 B1 * 12/2001 Seligmann ............. H04N 7/147
348/14.08
(Continued)

FOREIGN PATENT DOCUMENTS

WO 2016077180 A1 5/2016
WO 2017030985 A1 2/2017

OTHER PUBLICATIONS

Extended European Search Report for Application No. 18195477.7 dated Jan. 30, 2019, 9 pages.
(Continued)

*Primary Examiner* — Amal S Zenati
(74) *Attorney, Agent, or Firm* — Cantor Colburn LLP

(57) ABSTRACT

A collaborative virtual reality (VR) online meeting platform that includes a three-dimensional (3D) point cloud data defining a virtual space, identifiers of a plurality of meeting participants, and meeting data that includes positions in the virtual space of a plurality of avatars that correspond to meeting participants. The system includes a processor that includes instructions to initiate an online meeting of the plurality of meeting participants. The initiating includes providing an address of the 3D point cloud to each of the meeting participants and transmitting a copy of the 3D point cloud data and meeting data to each of the meeting participants. A current location of each of the avatars in the virtual space is communicated to all of the meeting participants.

23 Claims, 11 Drawing Sheets

(51) Int. Cl.
    *G06T 15/08* (2011.01)
    *H04L 29/06* (2006.01)
(52) U.S. Cl.
    CPC ............ *G06T 15/08* (2013.01); *H04L 65/403* (2013.01); *H04L 67/38* (2013.01)

(56) References Cited

U.S. PATENT DOCUMENTS

| | | |
|---|---|---|
| 8,705,012 B2 | 4/2014 | Greiner et al. |
| 2004/0104935 A1* | 6/2004 | Williamson ............ G06F 3/012 715/757 |
| 2009/0210804 A1 | 8/2009 | Kurata et al. |
| 2012/0192088 A1 | 7/2012 | Sauriol et al. |
| 2012/0204120 A1 | 8/2012 | Lefar et al. |
| 2016/0133230 A1* | 5/2016 | Daniels ................ G06T 19/006 345/633 |
| 2017/0208292 A1* | 7/2017 | Smits ................... H04N 13/243 13/243 |

OTHER PUBLICATIONS

Kauff et al, An Immersive 3D video-conferencing system using shared virtual team user enviornments, CVE (Proceedings of the international conference on collaborative virtual enviornments), 2002, 8 pages.

European Office Action for Application No. 18 195 477.7-1222 dated Nov. 5, 2019, 8 pages.

Maimone et al., "Real-time volumetric 3D capture of room sized scenes for telepresence" 3DTV-Conference: The True Vision—Capture, Transmission and Display of 3D Video, 2012, IEEE, pp. 1-4.

\* cited by examiner

COLLABORATIVE VIRTUAL REALITY ONLINE MEETING PLATFORM

CROSS REFERENCE TO RELATED APPLICATIONS

This application claims the benefit of U.S. Provisional Application Ser. No. 62/561,879, filed Sep. 22, 2017, the entire disclosure of which is incorporated herein by reference.

BACKGROUND

The subject matter described herein relates in general to a communication system, and in particular to a collaborative virtual reality online meeting platform.

Metrology devices, such as 3D laser scanner time-of-flight (TOF) coordinate measurement devices for example, may be used to generate three-dimensional (3D) representations of areas, such as buildings for example. A 3D laser scanner of this type steers a beam of light to a non-cooperative target such as a diffusely scattering surface of an object. A distance meter in the device measures a distance to the object, and angular encoders measure the angles of rotation of two axes in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data, referred to herein as a point cloud (or point cloud data), is collected, stored and sent to a processor or processors to generate a 3D image representing the scanned area or object.

The scan data for a project can be shared with multiple parties using web sharing tools such as SCENE™ WebShare Cloud which is manufactured by FARO Technologies, Inc. of Lake Mary, Fla. Web sharing tools can be used to view and analyze point cloud data, to communicate and share scanning projects made up of one or more point clouds with multiple parties in a secure fashion, and to upload point cloud data to a central location for storage. When the multiple parties are in different geographic locations, an online meeting tool such as GoToMeeting™ manufactured by LogMein, Inc. can be used to conduct meetings to discuss a scanning project. The meeting may include a detailed discussion of specific aspects of the point cloud data associated with the scanning project, however due to the size of the point cloud data it is represented as a simple two-dimensional image in the online meeting.

Accordingly, while point cloud data sharing systems and online meeting tools are suitable for their intended purposes, what is needed is an online meeting platform having certain features of embodiments of the present invention.

BRIEF DESCRIPTION

According to an embodiment of the present invention, a collaborative virtual reality (VR) online meeting platform system is provided. The system includes a three-dimensional (3D) point cloud data defining a virtual space, identifiers of a plurality of meeting participants, and meeting data. The meeting data includes positions in the virtual space of a plurality of avatars, each of the plurality of avatars corresponding to one of the meeting participants. The system also includes a processor that is responsive to executable computer instructions that when executed by the processor perform a method. The method includes initiating an online meeting of the plurality of meeting participants. The initiating includes providing an address of the 3D point cloud to each of the meeting participants and transmitting a copy of the 3D point cloud data and meeting data to each of the meeting participants. The method also includes coordinating the online meeting. The coordinating includes communicating a current location of each of the avatars in the virtual space to all of the meeting participants. The communicating includes receiving a position of an avatar in the virtual space from a meeting participant. The avatar corresponds to the meeting participant, and the meeting participant is one of the plurality of meeting participants. The meeting data is updated based at least in part on the received position, and the updated meeting data is provided to the meeting participants. The receiving, updating, and providing the updated meeting data are repeated while the meeting is in process.

According to an embodiment of the present invention, a method for providing a collaborative virtual reality (VR) online meeting platform includes providing a three-dimensional (3D) point cloud data and 3D computer aided design (CAD) geometry defining a virtual space is provided. Identifiers of a plurality of meeting participants are also provided. The 3D point cloud data is transmitted to each of the meeting participants. Meeting data, including positions in the virtual space of a plurality of avatars is also provided. Each of the plurality of avatars corresponds to one of the meeting participants. An online meeting of the plurality of meeting participants is initiated. The initiating includes transmitting a copy of the meeting data to each of the meeting participants. The online meeting is coordinated by communicating a current location of each of the avatars in the virtual space to all of the meeting participants. The communicating includes receiving a position of an avatar in the virtual space from a meeting participant as well as additional information such as, but not limited to orientation of the avatar and/or position/orientation of a user's hands/controllers. The avatar corresponds to the meeting participant, and the meeting participant is one of the plurality of meeting participants. The communicating also includes updating the meeting data based at least in part on the received position, and providing the updated meeting data to the meeting participants. The receiving, updating, and providing the updated meeting data are repeated while the meeting is in process.

According to an embodiment of the present invention, a computer program product that includes a computer readable storage medium having program instructions embodied therewith is provided. The program instructions provide a three-dimensional (3D) point cloud data defining a virtual space. Identifiers of a plurality of meeting participants are also provided. The 3D point cloud data is transmitted to each of the meeting participants. Meeting data, including positions in the virtual space of a plurality of avatars is also provided. Each of the plurality of avatars corresponds to one of the meeting participants. An online meeting of the plurality of meeting participants is initiated. The initiating includes transmitting a copy of the meeting data to each of the meeting participants. The online meeting is coordinated by communicating a current location of each of the avatars in the virtual space to all of the meeting participants. The communicating includes receiving a position of an avatar in the virtual space from a meeting participant. The avatar corresponds to the meeting participant, and the meeting participant is one of the plurality of meeting participants. The communicating also includes updating the meeting data based at least in part on the received position, and providing the updated meeting data to the meeting participants. The receiving, updating, and providing the updated meeting data are repeated while the meeting is in process.

According to an embodiment of the present invention, a system for participating in a collaborative virtual reality (VR) online meeting platform is provided. The system includes a three-dimensional (3D) point cloud defining a virtual space, and meeting data. The meeting data includes a first position in the virtual space of a first avatar representing a first meeting participant and a second position in the virtual space of a second avatar representing a second meeting participant. The system also includes a VR viewer utilized by the first meeting participant to view the virtual space and to display the first avatar at the first position in the virtual space and to display the second avatar at the second position in the virtual space. The system further includes a processor responsive to executable computer instructions that when executed by the processor perform a method. The method includes joining a meeting, the joining by the first meeting participant and the meeting having a duration. The method also includes performing repeatedly during the duration of the meeting: transmitting the updated position of the first avatar to a meeting coordinator based at least in part on receiving an updated position of the first avatar from the VR viewer; and displaying, via the VR viewer, the second avatar at the updated position of the second avatar in the virtual space based at least in part on receiving an updated position of the second avatar from the meeting coordinator.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments of the present invention relate to a collaborative virtual reality (VR) online meeting platform. An embodiment can be used to explore and discuss laser scanning projects using an online meeting platform that allows multiple users to explore a common virtual space in VR. In an embodiment, the common virtual space is represented by the scan data of a scanning project or point cloud data. As used herein the term "online meeting platform" refers to a meeting where participants in different geographic locations are viewing the same computer screen while talking over a voice line.

Embodiments of the present invention provide advantages over contemporary methods by providing the ability to meet online to explore a common virtual space using VR techniques. Travel expenses can be reduced by allowing multiple parties to remotely inspect the contents of scan projects such as, but not limited to, construction sites and crime scenes in a collaborative and interactive manner. The multiple parties can be located in their respective offices and meet at a remote location (represented by the scan data) in VR. The use of high quality point cloud renderings and communication between participants in VR described herein make it possible to replace on-site meetings with meetings in a common virtual space in VR.

Figure 1:
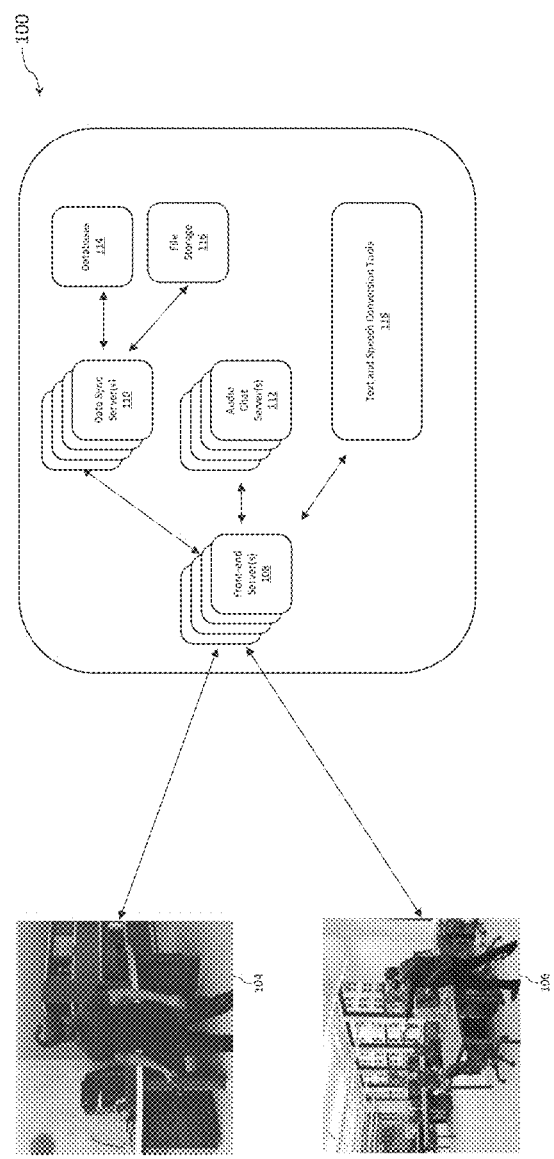
FIG. 1 is a schematic illustration of a collaborative virtual reality (VR) online meeting platform in accordance with one or more embodiments of the present invention.

Turning now to FIG. 1, a schematic illustration of a collaborative VR online meeting platform 100 is generally shown in accordance with one or more embodiments of the present invention. FIG. 1 shows a first meeting participant 104 located in a first geographic location and a second meeting participant 106 located in a second geographic location. As shown in FIG. 1, both the first meeting participant 104 and the second meeting participant 106 are using a cloud based system 102 to take part in a meeting where the participants share a common virtual space in VR. In an embodiment, a local processor at the first geographic location of the first meeting participant 104 accesses the front-end server(s) 108, and a local processor at the second geographic location of the second meeting participant 106 accesses the front-end server(s) 108.

The front-end server(s) 108 shown in FIG. 1 provides access to a data synchronization server(s) 110 which controls access to a point cloud(s) stored in a database 114 that is associated with the scanning project being discussed, as well as additional information such as meeting participant virtual location represented as an avatar and point cloud annotation data stored in file storage 116. In an embodiment, the data also includes a three-dimensional (3D) mesh or computer aided design (CAD) geometry along with a 3D point cloud (e.g., for a project where a designed object/ building is inspected in relation to the real environment as represented by the point cloud). The front-end server(s) 108 shown in FIG. 1 also provides an interface to an audio chat server(s) 112 to provide the ability for the meeting participants to talk with each other during the meeting. Also as shown in FIG. 1, the front-end server(s) 108 are coupled to text and speech conversion tools 118 such as, but not limited to, Amazon Lex and Amazon Polly both manufactured by Amazon Web Services, Inc. to allow for text input.

In an embodiment, the ability to schedule VR meetings is provided using the front-end server(s) 108 shown in FIG. 1. The initiator, or coordinator, of the meeting can provide the required scanning project data (e.g., point cloud data) and store it in the database(s) 114 in the cloud based system 102 cloud so that the participants can download it to their local processors before the meeting. Alternatively, one or more of the participants can stream the scanning project data live (only if there is sufficient bandwidth between the storage location in the cloud and the participant's computer. In an embodiment, each meeting has a unique identifier and hyperlink, and participants can open the hyperlink to join the meeting. In addition, the hyperlink can be utilized to get, retrieve or download information, such as the point cloud data for the project being discussed during the meeting or before the meeting starts. In an embodiment, the VR meetings are secured by passwords.

An embodiment provides the option of activating voice chat and/or video chat using the audio chat server(s) 112 shown in FIG. 1 to allow verbal communication between the meeting participants. Once the meeting starts, each participant enters the virtual space represented by the point cloud associated with the project and joins the meeting. In the exemplary embodiment, the point cloud data and the viewing software module are positioned locally relative to the user. Thus, each participant has their own local copy of the point cloud data. As used herein, the term "VR session" refers to the local software module executed on a local computer with the local copy of the point cloud data. Once joined to the meeting, the VR session begins and each participant can see the avatars of the other participants superimposed on their copy of the scanning project data. The view of each avatar can include, but is not limited to, where the avatar is located, where it is facing, and/or a direction that it is pointing (e.g., using a virtual laser pointer). In an embodiment, this additional information, referred to herein as "avatar data" is stored in a storage device such as file storage 116 shown in FIG. 1. In an embodiment, a copy of the avatar data for all of the participants is also stored in a local storage device at each of the geographic locations and updated by the cloud based system 102 when changes occur (e.g., an avatar representing a participant has moved in the virtual space and/or is pointing in a different direction).

In an embodiment, meeting creation and execution is integrated as a function into commercially available web sharing tools such SCENE™ WebShare Cloud which is manufactured by FARO Technologies, Inc. of Lake Mary, Fla. Commercially available web sharing tools can provide servers to synchronize the avatar data by receiving the required information from each participant and distributing it to all of the other participants. An additional level of security may be provided by requiring the participants to login to the web sharing tool.

In an embodiment, the rendering of the virtual environment on the VR viewers worn by the meeting participants is performed by a VR software module executing on a processor at each geographic location. The local software module can be implemented, for example, by FARO™ VR, which is manufactured by FARO Technologies, Inc. of Lake Mary, Fla., which can be coupled to a data synchronization server(s) 110 to send and receive data to the local computers of each participant on a constant, periodic or aperiodic basis in order to update the avatar data while the meeting is in process. The avatar data is overlaid in the virtual space in each local VR session so that the meeting participants can each view the avatar data associated with all of the meeting participants. The participants can collaboratively perform actions that include, but are not limited to discuss, measure, takes notes, list action items, take screen shots, view attached documents, and attach documents to the virtual scan project. The results of these actions can be viewed by the participant performing the action. In an embodiment, the participant performing the action may selectively share the results with some or all of the participants. These results may also be stored in cloud storage. Items added to the virtual scan project are referred to herein as annotation data and can be stored in a storage device such as file storage 116 shown in FIG. 1. In an embodiment, a copy of all or a subset of the annotation for the scanning project is also stored in a local storage device at each of the geographic locations and updated by the cloud based system 102 when updates occur. In an embodiment, updated annotation data is synchronized with each VR session.

In an embodiment, a report that includes meeting notes and/or action items is automatically generated based on the annotation data and sent to each of the meeting participants when the meeting concludes. In addition, the report can be added to the annotation data associated with the project.

An embodiment provides a function to record the meeting from the perspective of any of the participants for from a third person (e.g., flying eye camera) perspective.

An embodiment provides a master, or presentation, mode, where one participant, the presenter, has the ability to move the complete group of meeting participants (or a portion thereof) to another location in the virtual space or to present additional data to all of the meeting participants. This ability to keep the group together can be desirable when the scanning project includes large point clouds. Further, this may be desirable to provide each of the participants with the same experience during the VR session (e.g. the participant is looking at what the presenter believes to be important rather than elsewhere). In addition, the presenter can perform actions such as, but not limited to, mute/unmute all participants and hand over presenter role to another participant.

Figure 2:
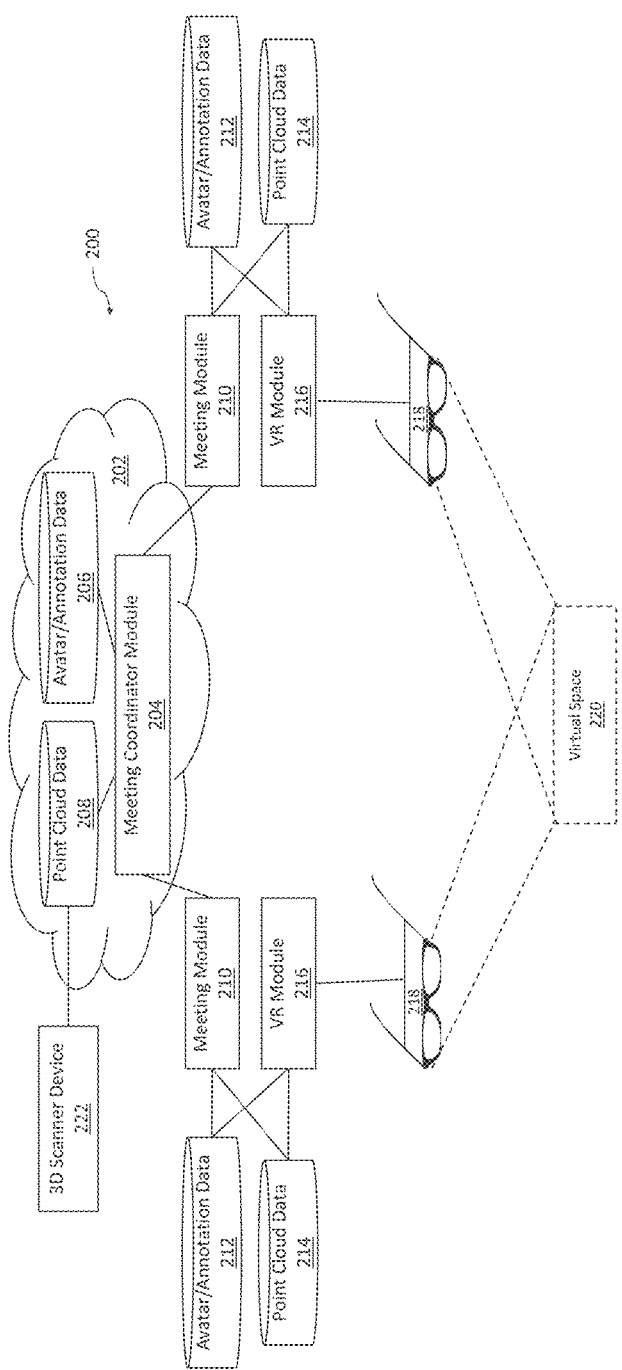
FIG. 2 is a schematic illustration of a collaborative VR online meeting platform in accordance with one or more embodiments of the present invention.

Turning now to FIG. 2, a schematic illustration of a collaborative VR online meeting platform 200 is generally shown in accordance with one or more embodiments of the present invention. The VR online meeting platform 200 shown in FIG. 2 includes a 3D scanner device 222 for measuring objects in a volume around the 3D scanner device 222. The scanner device 222 generates raw scan data, or point cloud data 208, made up of a plurality of points, each having spatial coordinate data associated therewidth. The point cloud data 208 can be stored on a data storage device in a database or in any known data structure. In an embodiment, the 3D scanner device 222 is a metrology device such as, but not limited to, laser scanner 32 described below in reference to FIGS. 6-8. The 3D scanner device 222 is not limited to scanning devices and can be implemented by any known device that generates 3D point clouds such as, but not limited to a photogrammetry device, a triangulation scanner, an articulated arm coordinate measurement machine or a laser tracker for example.

As shown in FIG. 2, a master copy of the point cloud data 208 along with a master copy of the avatar/annotation data 206 are stored in a cloud based location(s) 202 and accessed by a meeting coordinator module 204 executing on a processor in a cloud based location(s) 202. As used herein, the term "cloud based location" is used to refer to a location that is accessible via a network. An embodiment of processing performed by the meeting coordinator module 204 is described in reference to FIG. 4 below. In an embodiment, the meeting coordinator module 204 includes the front-end server(s) 108, data synchronization server(s) 110, audio chat server(s) 112, and text and speech conversion tools 118 shown in FIG. 1.

In the embodiment shown in FIG. 2, local copies of the meeting module 210 are executed on local processors for each of the meeting participants. The local copies of the meeting module 210 detect and report changes to the avatar and annotation data, and they receive and make updates to local copies of the avatar/annotation data 212. In addition, the local copies of the meeting module 210 can download local copies of the point cloud data 214 in preparation for the meeting. Processing performed by an embodiment of the local copy of the meeting module 210 is described below in reference to FIG. 5. In an embodiment, the local copies of the meeting module 210 and the VR modules 216 are executed by processors located in the same geographic location as the corresponding participant. In an embodiment, the meeting coordinator module 204 transmits a meeting invitation to the user (e.g. via email or text message). When the user "accepts" the meeting, the meeting module automatically downloads or schedules for download the point cloud data.

The VR viewers 218 shown in FIG. 2 can be implemented using any type of VR viewer known in the art such as, but not limited to headsets, goggles, smartphones, and other display devices. Examples of commercially available VR viewers that can be utilized include, but are not limited to VR headsets such as the HTC Vive™ and the Oculus Rift®. In an embodiment, at least one of the VR viewers 218 is a flat screen monitor that displays the image in two-dimensions (2D), using for example, a SCENE 3D view.

In an embodiment, each of the VR modules 216 operate to render images to each of the VR viewers 218 using points located in the local copies of the point cloud data 214 corresponding to current positions of the VR viewers 218. The VR modules 216 can be implemented by any software capable of executing on a processor to render images from point cloud data such as, but not limited to OpenVR provided by Valve Corporation. As shown in FIG. 2 the VR viewers 218 of each of the participants are accessing and moving around in the same virtual space 220 which is represented by the point cloud data 208 overlaid by the avatar/annotation data 206. In an embodiment, this is performed by keeping the local copies of the point cloud data 214 and the local copies of the avatar/annotation data 212 synchronized across the different geographic locations. In an embodiment, the meeting coordinator module 204 synchronizes the avatar/annotation data.

In an embodiment contents of the local copies of the point cloud data 214 and the master copy of the point cloud data 208 are the same and do not change. The contents of the local copies of the avatar/annotation data 212 and the master copy of the avatar/annotation data 206 are updated in real-time (or as close to real-time as possible depending on implementation constraints), on a periodic, or an aperiodic basis as the meeting participants move through the virtual space 220 and/or add annotations. The meeting coordinator module 204 synchronizes the updates to the avatar/annotation data 212 and the master copy of the avatar/annotation data 206.

The elements shown in FIG. 2 can be implemented as separate physical units as shown in FIG. 1 or they can be combined into one or more integrated units. For example, the local copy of the meeting module 210 and the local copy of the VR module 216 may be implemented by processors on the same multi-core computer system. In another example, the VR module 216 may be located on the VR viewer 218.

Figure 3:
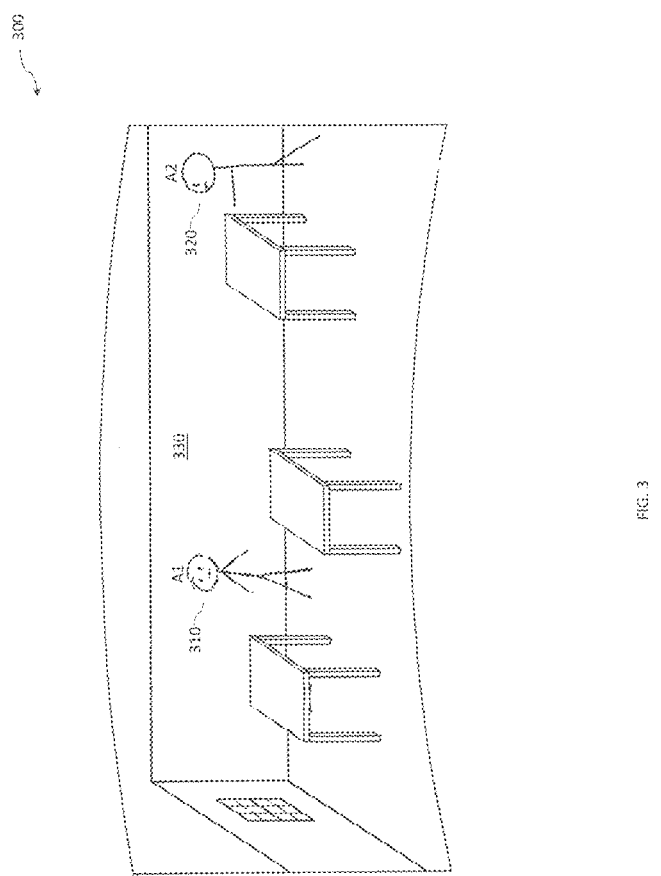
FIG. 3 is a schematic illustration of a virtual space in a VR environment in accordance with one or more embodiments of the present invention.

Turning now to FIG. 3, a portion 300 of a virtual space (e.g., virtual space 220 of FIG. 2) is generally shown in accordance with an embodiment. When viewed in a virtual reality device (e.g., VR viewer 218 of FIG. 2), the user will see in the display a representation of the environment 300 as shown in FIG. 3. It should be appreciated that the user will not see defined edges within the display, but the environment 300 will appear as one continuous space. In addition to the surfaces of the environment 300, such as wall surface 330 for example, that are defined by the point cloud data generated by a scanning device (e.g., 3D scanning device 222 of FIG. 2), the user will also see a current position of the meeting participants in the virtual space. As shown in FIG. 3, one meeting participant is represented by the avatar A1 310 and another by avatar A2 320. In an embodiment, more descriptive names can be used to represent the identity of the participant (e.g., first name, last name, etc.) and/or the functional area that they represent (e.g., quality control, engineering, etc.). As shown in FIG. 3, the meeting participant represented by avatar A1 310 is looking straight head and is at a location in the virtual space that is close to location of the meeting participant represented by avatar A2 320. The meeting participant represented by avatar A2 320 is facing towards and pointing in the direction of the avatar A1 310. In an embodiment, the avatars are not represented by human forms but instead by a graphics symbol or other representation.

In an embodiment, a pre-recorded avatar(s) that does not correspond to a meeting participant(s) is utilized when recording a VR session locally without any other participants. The pre-recorded data set can be made available online as a meeting so that a group of other people can meet in that space and see the avatar of the person who recorded the local VR session while replaying the pre-recorded interactions/voice recordings.

Figure 4:
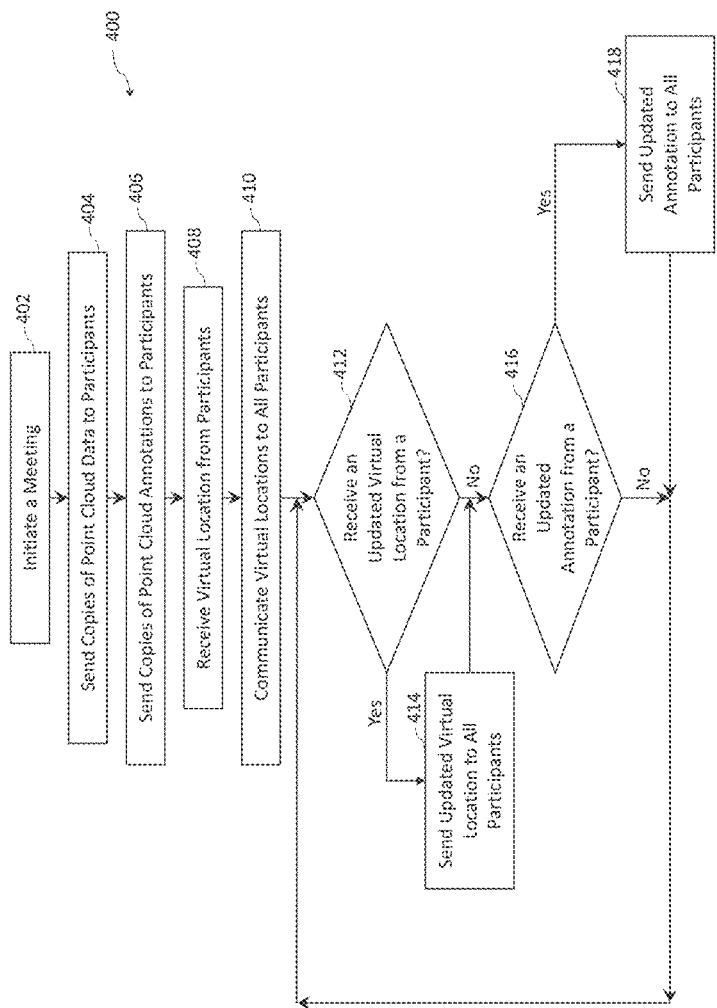
FIG. 4 is a flow diagram illustrating a method of providing a collaborative VR online meeting platform in accordance with one or more embodiments of the present invention.

Turning now to FIG. 4, a flow diagram 400 illustrating a method of providing a collaborative VR online meeting platform is generally shown in accordance with one or more embodiments of the present invention. In an embodiment, the processing shown in FIG. 4 is performed by meeting coordinator module 204 executing on a processor. At block 402, a meeting is initiated between a plurality of participants at different geographic locations (e.g., different country, different city, different office). In an embodiment, the meeting is initiated in response to a meeting invitation that is sent, for example by the meeting coordinator module 204, to the participants. At block 404, copies of point cloud data to be discussed in the meeting are sent to the participants along with copies of any annotation data associated with the point cloud data at block 406. In another embodiment, just the link to the point cloud data and annotations are sent to the meeting participants and the meeting participants perform the retrieval. The retrieval can be performed when the meeting starts or prior to the meeting starting (e.g., in response to receiving a meeting invitation). The participants initiate viewing the point cloud data using VR viewers and at block 408 the meeting coordinator module 204 receives locations, or positions, of the participants in the virtual space. The locations are communicated to all of the participants at block 410. In an embodiment, directions that the avatar is facing and/or pointing or avatar data are also received and communicated to all of the participants at block 410. In an embodiment, position and pose (look at direction) are synchronized between all participants. In embodiment, the positions of the hands and/or controllers of each participant are displayed and synchronized. In this manner all participants can understand if a participant is pointing to a specific detail. In an embodiment, a commercially available voice chat tool is utilized to exchange spoken words between the participants.

It is determined at block 412 whether an updated location in the virtual space has been received from one of the participants. If an updated location (or other avatar data) has been received, then processing continues at block 414 with the updated location being sent to all of the participants. In an embodiment, the positions of all of the meeting participants are sent at block 414. In another embodiment, only the updated location is sent at block 414. Processing continues at block 416 where it is determined whether an updated annotation has been received from one of the participants. If an updated annotation has been received, then processing continues at block 418 with the updated annotation being sent to all of the meeting participants. Blocks 412 through 418 are repeated for the duration of the meeting.

Figure 5:
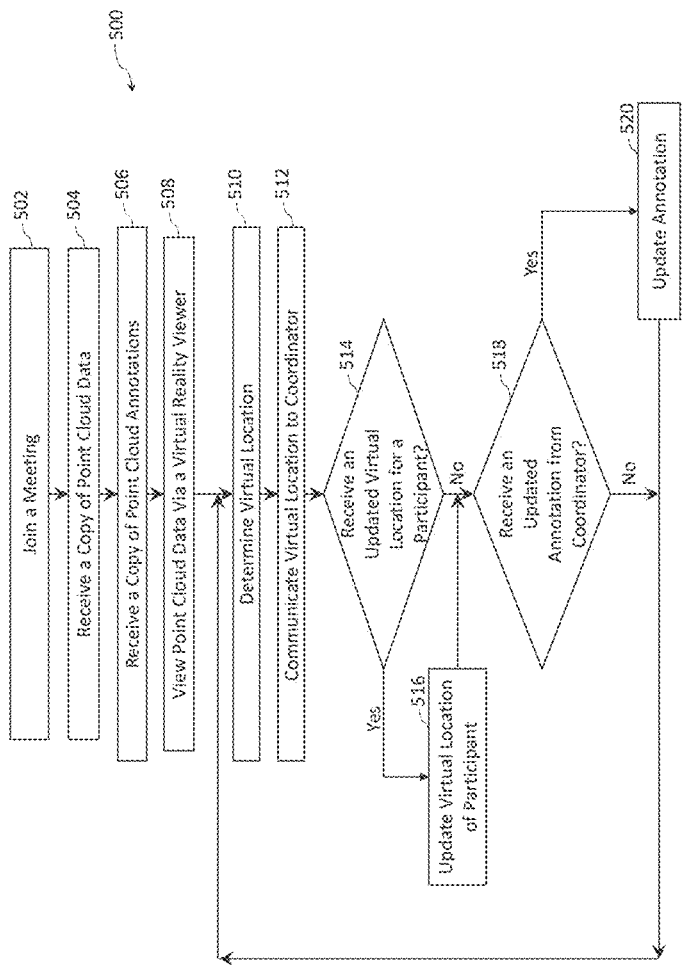
FIG. 5 is a flow diagram illustrating a method of utilizing a collaborative VR online meeting platform in accordance with one or more embodiments of the present invention.

Turning now to FIG. 5, a schematic illustration of a flow diagram 500 illustrating a method of utilizing a collaborative VR online meeting platform is generally shown in accordance with one or more embodiments of the present invention. In an embodiment, the processing shown in FIG. 5 is performed by meeting module 210 executing on a processor. At block 502, a meeting participant joins an online meeting. In an embodiment, the meeting participant receives a meeting invitation and joins the online meeting in response to receiving the meeting invitation. At block 504, a copy of the point cloud data to be discussed in the meeting is received, or alternatively retrieved by the meeting participant, along with copies of any annotation data associated with the point cloud data at block 506. The retrieval by the meeting participant can be performed when the meeting starts or prior to the meeting starting (e.g., in response to receiving a meeting invitation). At block 508, the meeting participant views a virtual space represented by the received point cloud data using a VR viewer. At block 510, the location of the meeting participant in the virtual space is determined and the location is communicated to the meeting coordinator module 204 at block 512. In an embodiment, a direction that the avatar is facing and/or pointing or other avatar data is also communicated to the meeting coordinator module 204 at block 512. In an embodiment, the software tracks the position, pose for head, and controllers. The software displays the point cloud and VR controllers which are stored as 3D vectors, or matrices, that can also be used to synchronize with the cloud. In an embodiment, interpolation is performed between these synchronized values (e.g., in the vectors or matrices) at the receiver side to smooth out the motion.

It is determined at block 514 whether an updated location (or other avatar data) in the virtual space for one of the other meeting participants has been received. If an updated location has been received, then processing continues at block 516 with the updated location being overlaid on the virtual space. Processing continues at block 518 where it is determined whether an updated annotation has been received. If an updated annotation has been received then processing continues at block 520 with the updated annotation is saved. Blocks 510 through 520 are repeated for the duration of the meeting.

Figure 6:
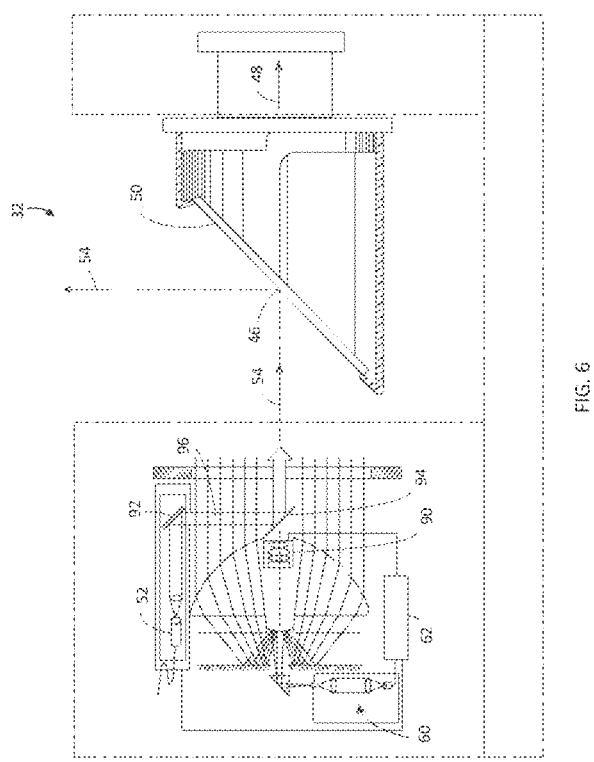
FIG. 6 is a partial side view of a laser scanner in accordance with one or more embodiments of the present invention.
Figure 7:
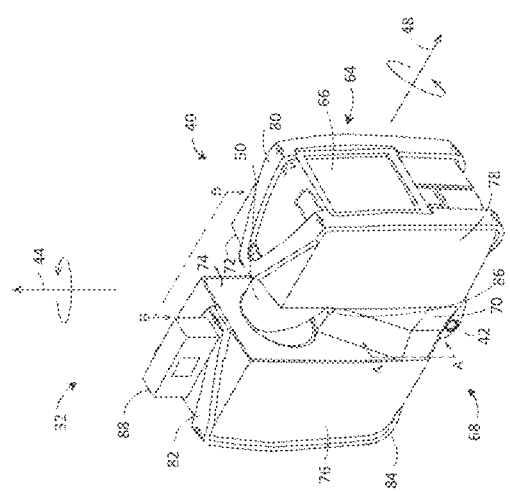
FIG. 7 is a perspective view of the laser scanner illustrating a method of measurement in accordance with one or more embodiments of the present invention
Figure 8:
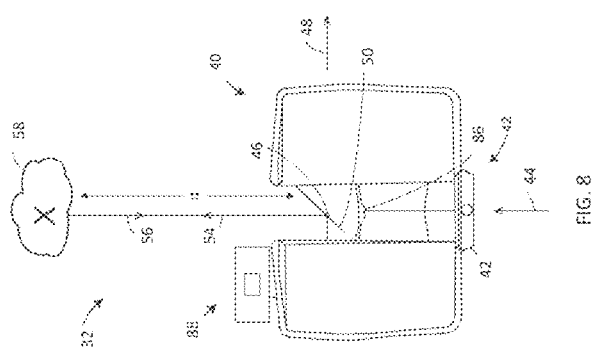
FIG. 8 is a schematic illustration partially in section along the line B-B of FIG. 7 of the optical, mechanical, and electrical components of the laser scanner in accordance with one or more embodiments of the present invention.

Referring now to FIGS. 6-8, an exemplary coordinate measurement device, laser scanner 32, is shown for optically scanning and measuring the environment in accordance with one or more embodiments of the present invention. The laser scanner 32 has a measuring head 40 and a base 42. The measuring head 40 is mounted on the base 42 such that the laser scanner 32 may be rotated about a vertical axis 44. In one embodiment, the measuring head 40 includes a gimbal point 46 that is a center of rotation about the vertical axis 44 and a horizontal axis 48. The measuring head 40 has a rotary mirror 50, which may be rotated about the horizontal axis 48. The rotation about the vertical axis may be about the center of the base 42. The terms vertical axis and horizontal axis refer to the scanner in its normal upright position. In other words, with the axis 44 extending approximately perpendicular to the floor or ground and the axis 48 being approximately parallel with the floor or ground. It should be appreciated that it is also possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative nomenclature for the vertical axis.

The measuring head 40 is further provided with an electromagnetic radiation emitter, such as light emitter 52, for example, that emits an emitted light beam 54. In one embodiment, the emitted light beam 54 is a coherent light beam such as a laser beam. The laser beam may have a wavelength range of approximately 300 to 1600 nanometers, for example 790 nanometers, 905 nanometers, 1550 nanometers, or less than 400 nanometers. It should be appreciated that other electromagnetic radiation beams having greater or smaller wavelengths may also be used. The emitted light beam 54 may be amplitude or intensity modulated, for example, with a sinusoidal waveform or with a rectangular waveform. The emitted light beam 54 is emitted by the light emitter 52 onto the rotary mirror 50, where it is deflected to the environment. A reflected light beam 56 is reflected from the environment by an object 58. The reflected or scattered light is intercepted by the rotary mirror 50 and directed into a light receiver 60. The directions of the emitted light beam 54 and the reflected light beam 56 result from the angular positions of the rotary mirror 50 and the measuring head 40 about the axes 44, 48 respectively. These angular positions in turn depend on the corresponding rotary drives or motors.

Coupled to the light emitter 52 and the light receiver 60 is a 3D scanner processor, or controller 62. The controller 62 determines, for a multitude of measuring points X, a corresponding number of distances d between the laser scanner 32 and the points X on object 58. The distance to a particular point X is determined (e.g., by a distance meter implemented by the controller 62) based at least in part on the speed of light in air through which electromagnetic radiation propagates from the device to the object point X. In one embodiment the phase shift of modulation in light emitted by the laser scanner 32 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the TOF of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 about axis 25 relatively quickly while rotating the measuring head 22 about axis 23 relatively slowly, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 46 to an object point X, the laser scanner 32 may also collect gray-scale information related to the received optical power (equivalent to the term "brightness.") The gray-scale value may be determined at least in part, for example, by integration of the bandpass-filtered and amplified signal in the light receiver 60 over a measuring period attributed to the object point X.

The measuring head 40 may include a display device 64 integrated into the laser scanner 32. The display device 64 may include a graphical touch screen 66, as shown in FIG. 6, which allows the operator to set the parameters or initiate the operation of the laser scanner 32. For example, the screen 66 may have a user interface that allows the operator to provide measurement instructions to the device, and the screen may also display measurement results.

The laser scanner 32 includes a carrying structure 68 that provides a frame for the measuring head 40 and a platform for attaching the components of the laser scanner 32. In one embodiment, the carrying structure 68 is made from a metal such as aluminum. The carrying structure 68 includes a traverse member 70 having a pair of walls 72, 74 on opposing ends. The walls 72, 74 are parallel to each other and extend in a direction opposite the base 42. Shells 76, 78 are coupled to the walls 72, 74 and cover the components of the laser scanner 32. In the exemplary embodiment, the shells 76, 78 are made from a plastic material, such as polycarbonate or polyethylene for example. The shells 76, 78 cooperate with the walls 72, 74 to form a housing for the laser scanner 32.

On an end of the shells 76, 78 opposite the walls 72, 74 a pair of yokes 80, 82 are arranged to partially cover the respective shells 76, 78. In the exemplary embodiment, the yokes 80, 82 are made from a suitably durable material, such as aluminum for example, that assists in protecting the shells 76, 78 during transport and operation. The yokes 80, 82 each includes a first arm portion 84 that is coupled, such as with a fastener for example, to the traverse 70 adjacent the base 42. The arm portion 84 for each yoke 80, 82 extends from the traverse 70 obliquely to an outer corner of the respective shell 76, 78. From the outer corner of the shell, the yokes 80, 82 extend along the side edge of the shell to an opposite outer corner of the shell. Each yoke 80, 82 further includes a second arm portion that extends obliquely to the walls 72, 74. It should be appreciated that the yokes 80, 82 may be coupled to the traverse 70, the walls 72, 74 and the shells 76, 78 at multiple locations.

The pair of yokes 80, 82 cooperate to circumscribe a convex space within which the two shells 76, 78 are arranged. In the exemplary embodiment, the yokes 80, 82 cooperate to cover all of the outer edges of the shells 76, 78, while the top and bottom arm portions project over at least a portion of the top and bottom edges of the shells 76, 78. This provides advantages in protecting the shells 76, 78 and the measuring head 40 from damage during transportation and operation. In other embodiments, the yokes 80, 82 may include additional features, such as handles to facilitate the carrying of the laser scanner 32 or attachment points for accessories for example.

On top of the traverse 70, a prism 86 is provided. The prism 86 extends parallel to the walls 72, 74. In the exemplary embodiment, the prism 86 is integrally formed as part of the carrying structure 68. In other embodiments, the prism 86 is a separate component that is coupled to the traverse 70. When the mirror 50 rotates, during each rotation the mirror 50 directs the emitted light beam 54 onto the traverse 70 and the prism 86. Due to non-linearities in the electronic components, for example in the light receiver 60, the measured distances d may depend on signal strength, which may be measured in optical power entering the scanner or optical power entering optical detectors within the light receiver 56, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 60. Since the prism 86 is at a known distance from the gimbal point 46, the measured optical power level of light reflected by the prism 86 may be used to correct distance measurements for other measured points, thereby allowing for compensation to correct for the effects of environmental variables such as temperature. In the exemplary embodiment, the resulting correction of distance is performed by the controller 62.

In an embodiment, the controller 62 represents one or more processors distributed throughout the scanner 32 or external to the scanner 32. The one or more processor may include one or more computing devices connected for communications via a network. The computing devices may be arranged in a distributed arrangement to operate cooperatively to process data from the scanner 32. The processors may be microprocessors, field programmable gate arrays (FPGAs), digital signal processors (DSPs), and generally any device capable of performing computing functions. The one or more processors have access to memory (volatile or nonvolatile) for storing information. In addition, one or more of the processors of the controller 62 may provide support for remote computing capability. Communication between the processors may be through a wired, wireless, or a combination of wired and wireless data connection or medium.

In an embodiment, the base 42 is coupled to a swivel assembly (not shown) such as that described in commonly owned U.S. Pat. No. 8,705,012 ('012), which is incorporated by reference herein. The swivel assembly is housed within the carrying structure 68 and includes a motor that is configured to rotate the measurement head 40 about the axis 44.

An auxiliary image acquisition device 88 may be a device that captures and measures a parameter associated with the scanned volume or the scanned object and provides a signal representing the measured quantities over an image acquisition area. The auxiliary image acquisition device 88 may be, but is not limited to, a color camera, pyrometer, a thermal imager, an ionizing radiation detector, or a millimeter-wave detector.

In an embodiment, a camera (first image acquisition device) 90 is located internally to the scanner 32 and may have the same optical axis as the 3D scanner device. In this embodiment, the first image acquisition device 90 is integrated into the measuring head 40 and arranged to acquire images along the same optical pathway as emitted light beam 54 and reflected light beam 56. In this embodiment, the light from the light emitter 52 reflects off a fixed mirror 92 and travels to dichroic beam-splitter 94 that reflects the light 96 from the light emitter 52 onto the rotary mirror 50. The dichroic beam-splitter 94 allows light to pass through at wavelengths different than the wavelength of light 96. For example, the light emitter 52 may be a near infrared laser light (for example, light at wavelengths of 780 nm or 1150 nm), with the dichroic beam-splitter 94 configured to reflect the infrared laser light while allowing visible light (e.g., wavelengths of 400 to 700 nm) to transmit through. In other embodiments, the determination of whether the light passes through the beam-splitter 94 or is reflected depends on the polarization of the light. The digital camera 90 acquires 2D photographic images of the scanned area to capture color data (texture) to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 44 and by steering the mirror 50 about the axis 48.

It is understood in advance that although this disclosure describes the collaborative VR online meeting platform in reference to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. In essence, cloud computing is an infrastructure made up of a network of interconnected nodes.

Figure 9:
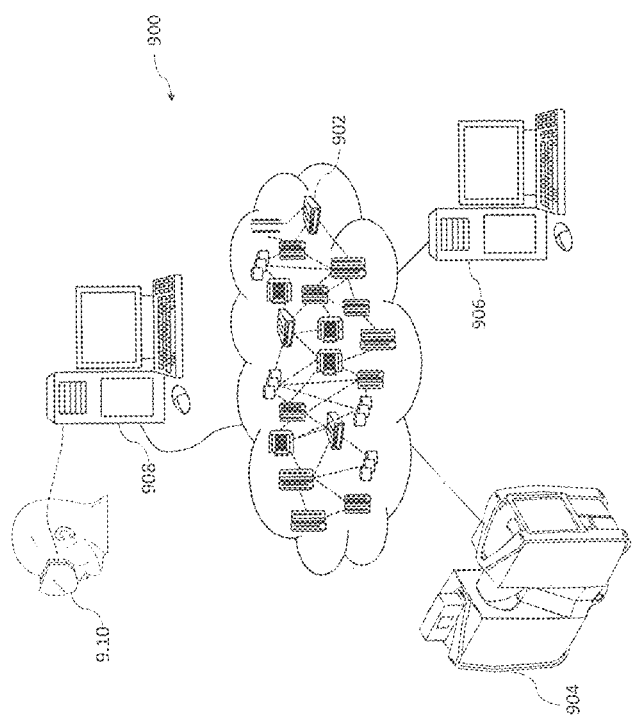
FIG. 9 is a schematic illustration of a cloud computing environment in accordance with one or more embodiments of the present invention.

Referring now to FIG. 9, an illustrative cloud computing environment 900 is depicted. As shown, cloud computing environment 900 comprises one or more cloud computing nodes 902 with which local computing devices used by cloud consumers, such as, for example, coordinate measurement device 904, a computer 906, and a computer 908 connected to a virtual reality device 910 may communicate. In an embodiment, the VR session is performed through the cooperation of computer 908 and the virtual reality device 910. Nodes 902 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 904-910 shown in FIG. 9 are intended to be illustrative only and that computing nodes 902 and cloud computing environment 900 can communicate with any type of computerized device over any type of network and/or network addressable connection (e.g., using a web browser).

Figure 10:
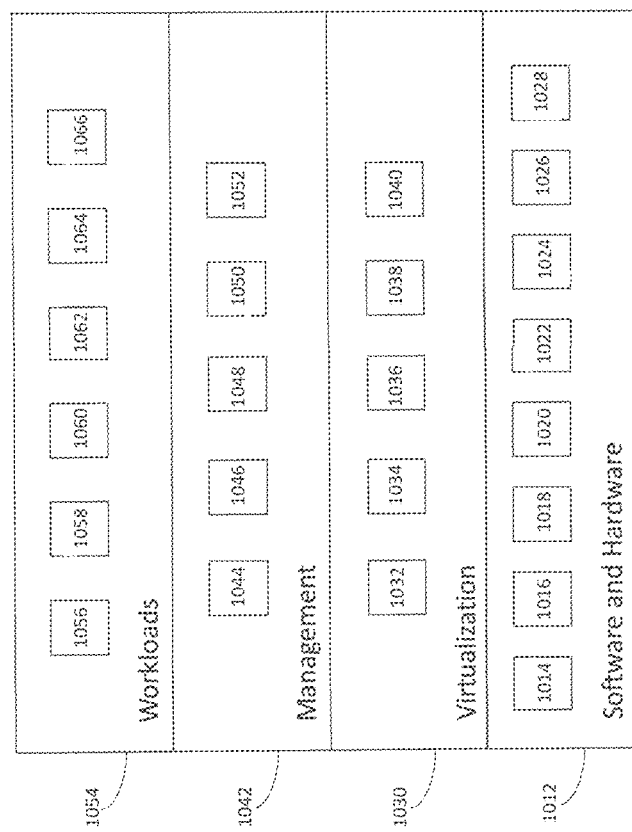
FIG. 10 is a schematic illustration of an abstraction model layers in accordance with one or more embodiments of the present invention.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided: hardware and software layer 1012 includes hardware and software components. Examples of hardware components include: mainframes 1014; RISC (Reduced Instruction Set Computer) architecture based servers 1016; servers 1018; blade servers 1020; storage devices 1022; and networks and networking components 1024. In some embodiments, software components include network application server software 1026 and database software 1028; virtualization layer 1030 provides an abstraction layer from which the following examples of virtual entities may be provided: virtual servers 1032; virtual storage 1034; virtual networks 1036, including virtual private networks; virtual applications and operating systems 1038; and virtual clients 1040.

In one example, management layer 1042 may provide the functions described below. Resource provisioning 1044 provides dynamic procurement of computing resources and other resources that are utilized to perform tasks within the cloud computing environment. Metering and pricing 1046 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1048 provides access to the cloud computing environment for consumers and system administrators. Service level management 1050 provides cloud computing resource allocation and management such that required service levels are met. Service Level Agreement (SLA) planning and fulfillment 1052 provides pre-arrangement for, and procurement of, cloud computing resources for which a future requirement is anticipated in accordance with an SLA.

Workloads layer 1054 provides examples of functionality for which the cloud computing environment may be utilized. Examples of workloads and functions which may be provided from this layer include: mapping and navigation 1056; software development and lifecycle management 1058; transaction processing 1060; point cloud to virtual reality data processing 1064; user defined content to point cloud processing 1066; and virtual reality data file generation and delivery processing 1068.

Figure 11:
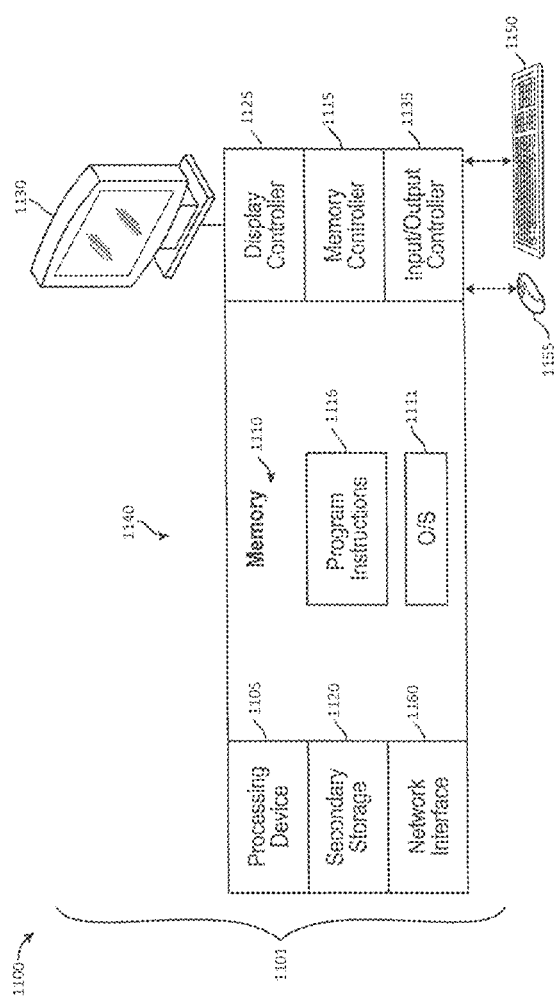
FIG. 11 is a schematic illustration of a computer system in accordance with one or more embodiments of the present invention.

Turning now to FIG. 11, a schematic illustration of a system 1100 is depicted upon which aspects of one or more embodiments of a collaborative VR online meeting platform may be implemented. In an embodiment, all or a portion of the system 1100 may be incorporated into one or more of the 3D scanner device and processors described herein. In one or more exemplary embodiments, in terms of hardware architecture, as shown in FIG. 11, the computer 1101 includes a processing device 1105 and a memory 1110 coupled to a memory controller 1115 and an input/output controller 1135. The input/output controller 1135 can be, for example, but not limited to, one or more buses or other wired or wireless connections, as is known in the art. The input/output controller 1135 may have additional elements, which are omitted for simplicity, such as controllers, buffers (caches), drivers, repeaters, and receivers, to enable communications. Further, the computer 1101 may include address, control, and/or data connections to enable appropriate communications among the aforementioned components.

In one or more exemplary embodiments, a keyboard 1150 and mouse 1155 or similar devices can be coupled to the input/output controller 1135. Alternatively, input may be received via a touch-sensitive or motion sensitive interface (not depicted). The computer 1101 can further include a display controller 1125 coupled to a display 1130. It should be appreciated that a VR viewer (e.g., VR viewer 218 of FIG. 2) may be coupled to the system 1100.

The processing device 1105 is a hardware device for executing software, particularly software stored in secondary storage 1120 or memory 1110. The processing device 1105 can be any custom made or commercially available computer processor, a central processing unit (CPU), an auxiliary processor among several processors associated with the computer 1101, a semiconductor-based microprocessor (in the form of a microchip or chip set), a macroprocessor, or generally any device for executing instructions.

The memory 1110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory 1110 may incorporate electronic, magnetic, optical, and/or other types of storage media. Accordingly, the memory 1110 is an example of a tangible computer readable storage medium 1140 upon which instructions executable by the processing device 1105 may be embodied as a computer program product. The memory 1110 can have a distributed architecture, where various components are situated remote from one another, but can be accessed by the processing device 1105.

The instructions in memory 1110 may include one or more separate programs, each of which comprises an ordered listing of executable instructions for implementing logical functions. In the example of FIG. 11, the instructions in the memory 1110 include a suitable operating system (OS) 1111 and program instructions 1116. The operating system 1111 essentially controls the execution of other computer programs and provides scheduling, input-output control, file and data management, memory management, and communication control and related services. When the computer 1101 is in operation, the processing device 1105 is configured to execute instructions stored within the memory 1110, to communicate data to and from the memory 1110, and to generally control operations of the computer 1101 pursuant to the instructions. Examples of program instructions 1116 can include instructions to implement the processing described herein in reference to FIGS. 1-10.

The computer 1101 of FIG. 11 also includes a network interface 1160 that can establish communication channels with one or more other computer systems via one or more network links. The network interface 1160 can support wired and/or wireless communication protocols known in the art. For example, when embodied in a user system, the network interface 1160 can establish communication channels with an application server.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, GPU devices, computing devices, microcontrollers, digital signal processors, or like devices, as further described herein. A CPU typically performs a variety of tasks while a GPU is optimized to display images.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The term "about" is intended to include the degree of error associated with measurement of the particular quantity based upon the equipment available at the time of filing the application. For example, "about" can include a range of ±8% or 5%, or 2% of a given value.

What is claimed is:

1. A system for providing a collaborative virtual reality (VR) online meeting platform, the system comprising:
   three-dimensional (3D) point cloud data defining a virtual space, the virtual space representing a physical environment that was measured by metrology device;
   identifiers of a plurality of meeting participants;
   meeting data including positions in the virtual space of a plurality of avatars, each of the plurality of avatars corresponding to one of the meeting participants; and
   a processor responsive to executable computer instructions that when executed by the processor perform a method comprising:
      initiating an online meeting of the plurality of meeting participants in the virtual space, the initiating including providing an address of the 3D point cloud data to each of the meeting participants and transmitting a copy of the 3D point cloud data and meeting data to each of the meeting participants; and
      coordinating the online meeting, the coordinating including communicating a current location of each of the avatars in the virtual space to all of the meeting participants, the communicating including:
         receiving a position of an avatar in the virtual space from a meeting participant, the avatar corresponding to the meeting participant, the meeting participant one of the plurality of meeting participants;
         updating the meeting data based at least in part on the received position;
         providing the updated meeting data to the meeting participants; and
         repeating the receiving, updating, and providing the updated meeting data while the meeting is in process.

2. The system of claim 1, wherein the meeting data further includes, for each of the avatars, a direction that the avatar is facing that is communicated to all of the meeting participants.

3. The system of claim 1, wherein the meeting data further includes, for at least one of the avatars, a direction that the avatar is pointing that is communicated to all of the meeting participants.

4. The system of claim 1, wherein the participant is viewing the virtual space using a 3D VR viewer to view an image rendered based on the 3D point cloud data with the avatars overlaid at their respective positions.

5. The system of claim 1, wherein the participant is viewing the virtual space using a two-dimensional (2D) display to view an image rendered based on the 3D point cloud data with the avatars overlaid at their respective positions.

6. The system of claim 1, wherein the meeting data further includes annotation data.

7. The system of claim 1, further comprising the metrology device, the metrology device comprising a laser scanner for scanning the physical environment and acquiring the 3D point cloud data.

8. A method for providing a collaborative virtual reality (VR) online meeting platform, the method comprising:
   providing a three-dimensional (3D) point cloud data defining a virtual space, the virtual space representing a physical environment that was measured by metrology device;
   providing identifiers of a plurality of meeting participants;
   transmitting the 3D point cloud data to each of the meeting participants;
   providing meeting data including positions in the virtual space of a plurality of avatars, each of the plurality of avatars corresponding to one of the meeting participants;
   initiating, by a processor, an online meeting of the plurality of meeting participants in the virtual space, the initiating including transmitting a copy of the meeting data to each of the meeting participants; and
   coordinating the online meeting, the coordinating including communicating a current location of each of the avatars in the virtual space to all of the meeting participants, the communicating including:
      receiving a position of an avatar in the virtual space from a meeting participant, the avatar corresponding to the meeting participant, the meeting participant one of the plurality of meeting participants;
      updating the meeting data based at least in part on the received position;
      providing the updated meeting data to the meeting participants; and
      repeating the receiving, updating, and providing the updated meeting data while the meeting is in process.

9. The method of claim 8, wherein the initiating further includes providing an address of the 3D point cloud data to each of the meeting participants.

10. The method of claim 8, wherein the meeting data further includes, for each of the avatars, a direction that the avatar is facing that is communicated to all of the meeting participants.

11. The method of claim 8, wherein the meeting data further includes, for at least one of the avatars, a direction that the avatar is pointing that is communicated to all of the meeting participants.

12. The method of claim 8, wherein the participant is viewing the virtual space using a 3D VR viewer to view an image rendered based on the 3D point cloud data with the avatars overlaid at their respective positions.

13. The method of claim 8, wherein the participant is viewing the virtual space using a two-dimensional (2D) display to view an image rendered based on the 3D point cloud data with the avatars overlaid at their respective positions.

14. The method of claim 8, wherein the meeting data further includes annotation data.

15. The method of claim 8, further comprising providing the metrology device, the metrology device comprising a laser scanner for capturing the 3D point cloud data.

16. A computer program product comprising a non-transitory computer readable storage medium having program instructions embodied therewith, the program instructions:
   providing a three-dimensional (3D) point cloud data defining a virtual space, the virtual space representing a physical environment that was measured by a metrology device
   providing identifiers of a plurality of meeting participants;
   providing meeting data including positions in the virtual space of a plurality of avatars, each of the plurality of avatars corresponding to one of the meeting participants;
   transmitting the 3D point cloud data to each of the meeting participants;
   initiating, by a processor, an online meeting of the plurality of meeting participants in the virtual space, the initiating including transmitting a copy of the meeting data to each of the meeting participants; and coordinating the online meeting, the coordinating including communicating a current location of each of the avatars in the virtual space to all of the meeting participants, the communicating including:
receiving a position of an avatar in the virtual space from a meeting participant, the avatar corresponding to the meeting participant, the meeting participant one of the plurality of meeting participants;
updating the meeting data based at least in part on the received position;
providing the updated meeting data to the meeting participants; and
repeating the receiving, updating, and providing the updated meeting data while the meeting is in process.

17. The computer program product of claim 16, wherein the initiating further includes providing an address of the 3D point cloud data to each of the meeting participants.

18. A system for participating in a collaborative virtual reality (VR) online meeting platform, the system comprising:
a three-dimensional (3D) point cloud defining a virtual space, the virtual space representing a physical environment that was measured by a metrology device;
meeting data including a first position in the virtual space of a first avatar representing a first meeting participant and a second position in the virtual space of a second avatar representing a second meeting participant;
a VR viewer utilized by the first meeting participant to view the virtual space and to display the first avatar at the first position in the virtual space and to display the second avatar at the second position in the virtual space; and
a processor responsive to executable computer instructions that when executed by the processor perform a method comprising:
joining a meeting, the joining by the first meeting participant and the meeting having a duration;
performing repeatedly during the duration of the meeting:
transmitting the updated position of the first avatar to a meeting coordinator based at least in part on receiving an updated position of the first avatar from the VR viewer; and
displaying, via the VR viewer, the second avatar at an updated position of the second avatar in the virtual space based at least in part on receiving the updated position of the second avatar from the meeting coordinator.

19. The system of claim 18, wherein the updated position of one or both of the first avatar and the second avatar includes a direction that the avatar is facing.

20. The system of claim 18, wherein the updated position of one or both of the first avatar and the second avatar includes a direction that the avatar is pointing.

21. The system of claim 18, wherein the VR is a two-dimensional (2D) display.

22. The system of claim 18, wherein the meeting data further includes annotation data.

23. The system of claim 18, further comprising the metrology device, the metrology device comprising a laser scanner for capturing the 3D point cloud data.

* * * * *